Figures 5, 6:
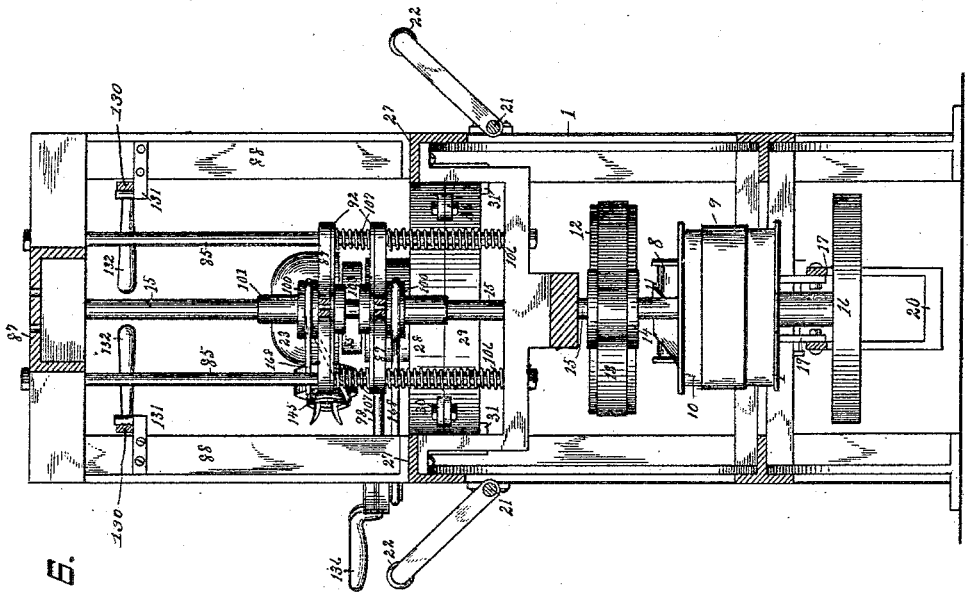

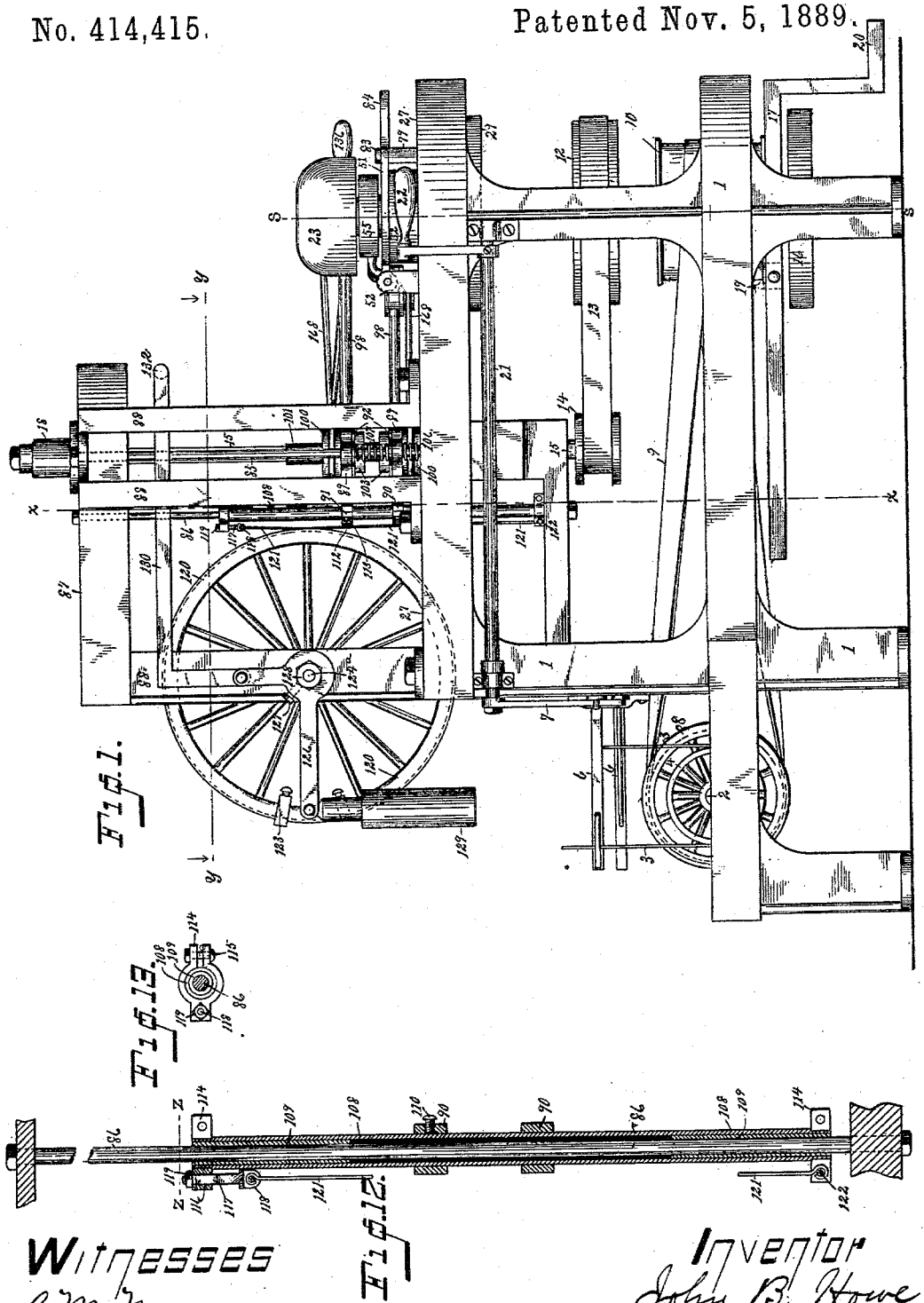

(No Model.) 7 Sheets—Sheet 2.
J. B. HOWE.
HAT POUNCING MACHINE.
No. 414,415. Patented Nov. 5, 1889.
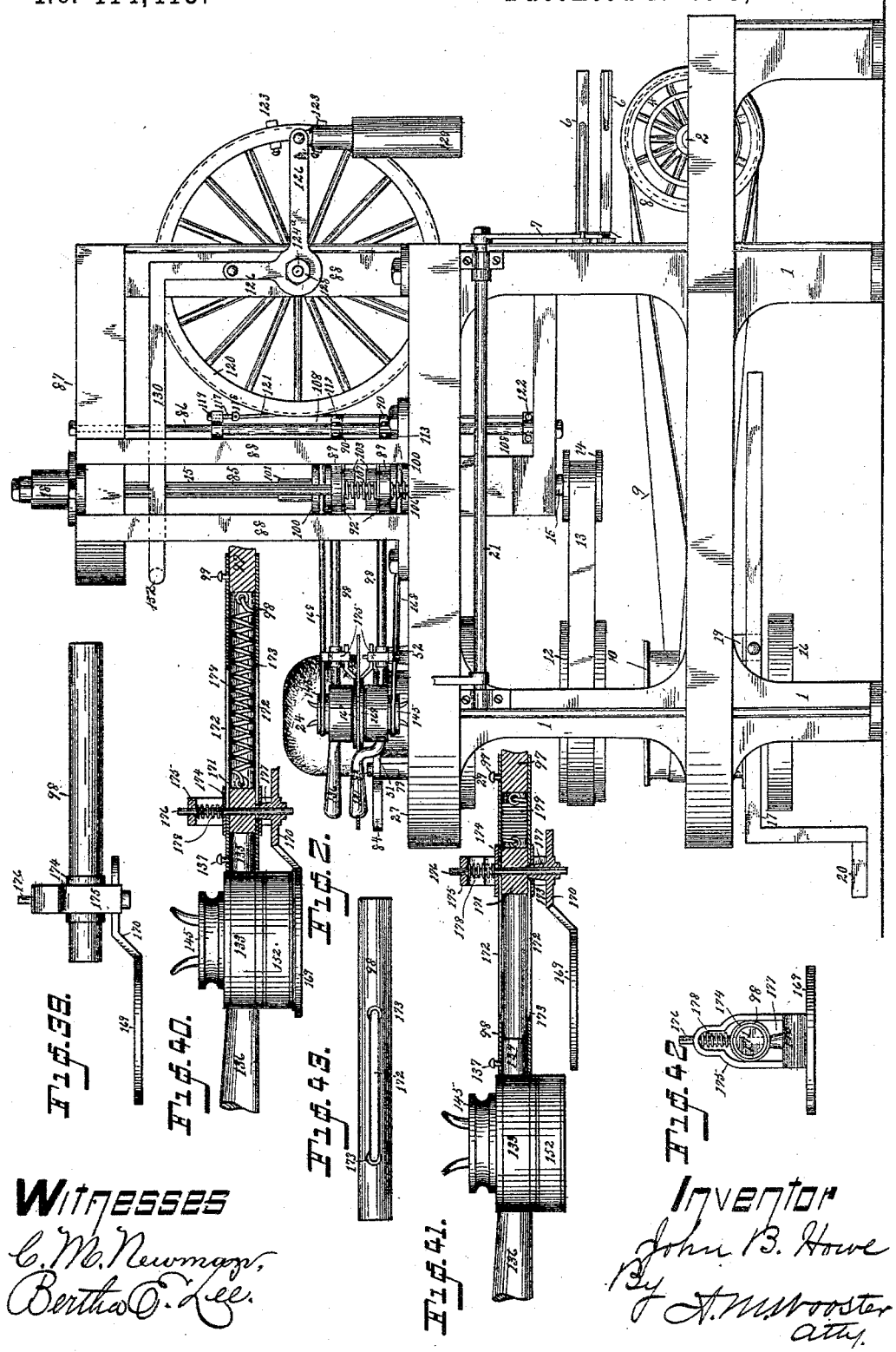
Witnesses
C. M. Newman
Bertha O. Lee
Inventor
John B. Howe
By A. M. Wooster
atty.

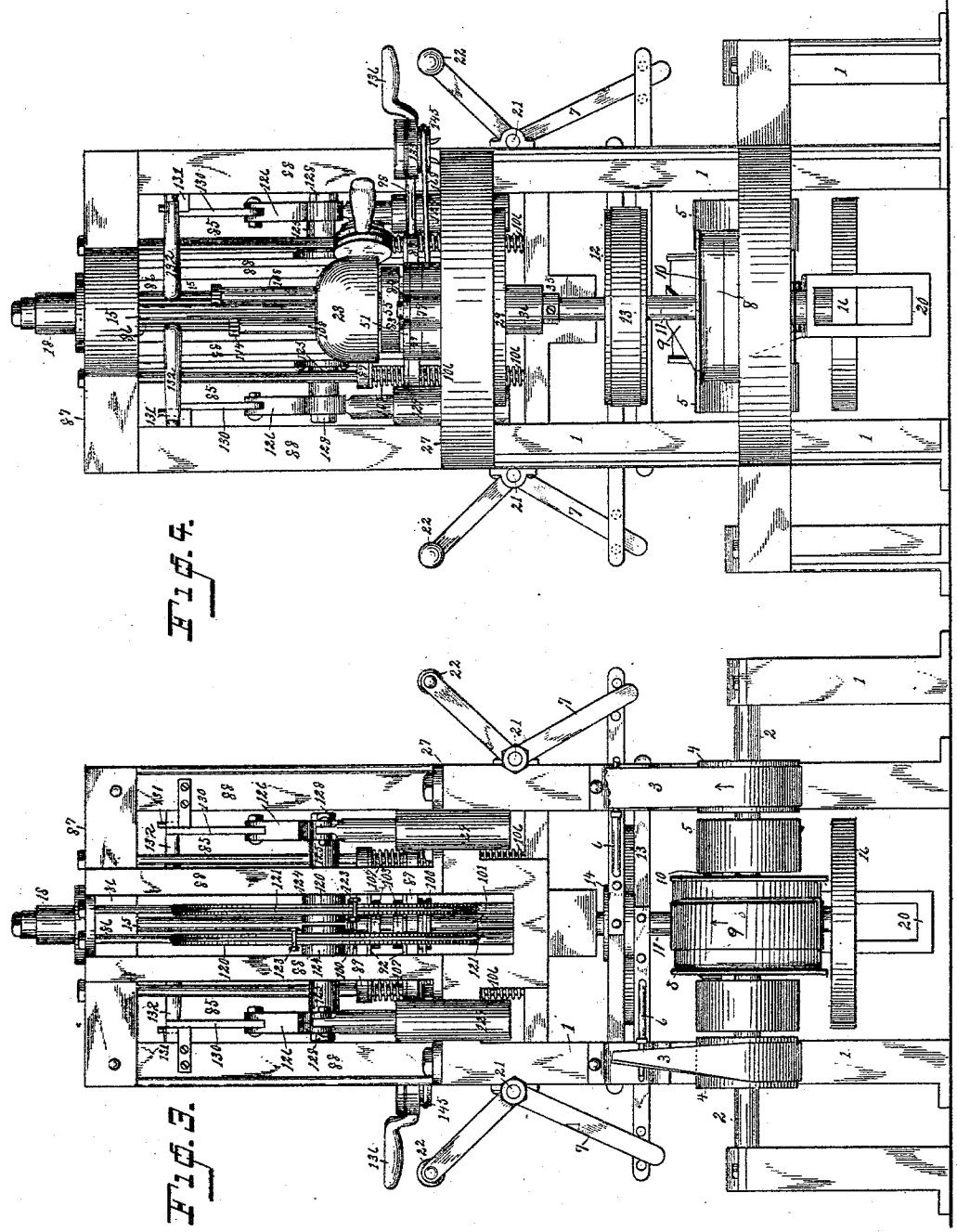

(No Model.) 7 Sheets—Sheet 4.
J. B. HOWE.
HAT POUNCING MACHINE.
No. 414,415. Patented Nov. 5, 1889.

Witnesses
C. M. Newman,
Bertha E. Lee.

Inventor
John B. Howe
By F. M. Wooster
Atty.

(No Model.) 7 Sheets—Sheet 5.
J. B. HOWE.
HAT POUNCING MACHINE.
No. 414,415. Patented Nov. 5, 1889.
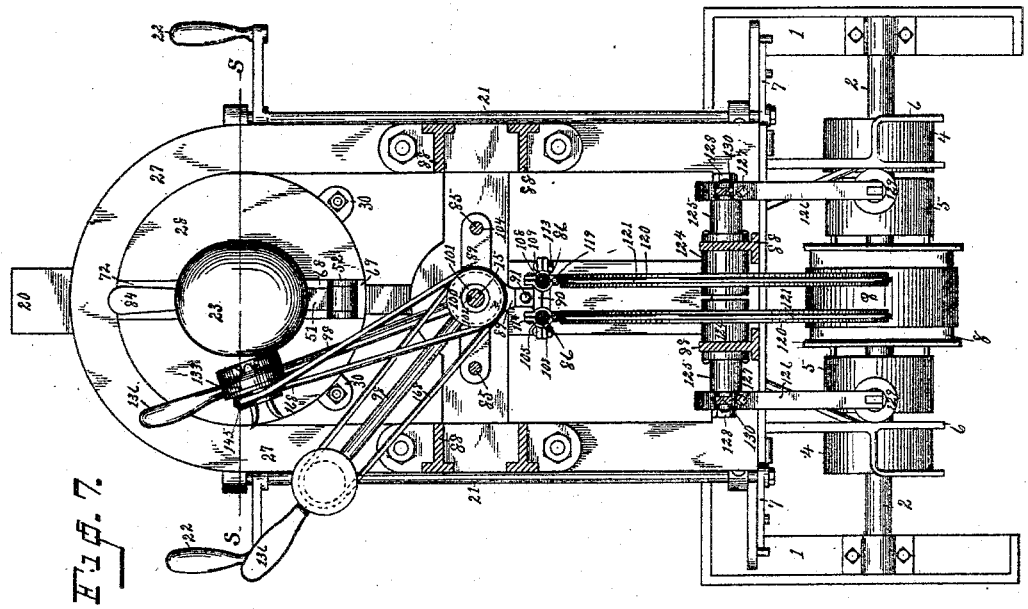
Witnesses
C. M. Newman,
Bertha E. Lee.
Inventor
John B. Howe
By H. M. Wooster
Atty (No Model.) 7 Sheets—Sheet 6.
J. B. HOWE.
HAT POUNCING MACHINE.
No. 414,415. Patented Nov. 5, 1889.
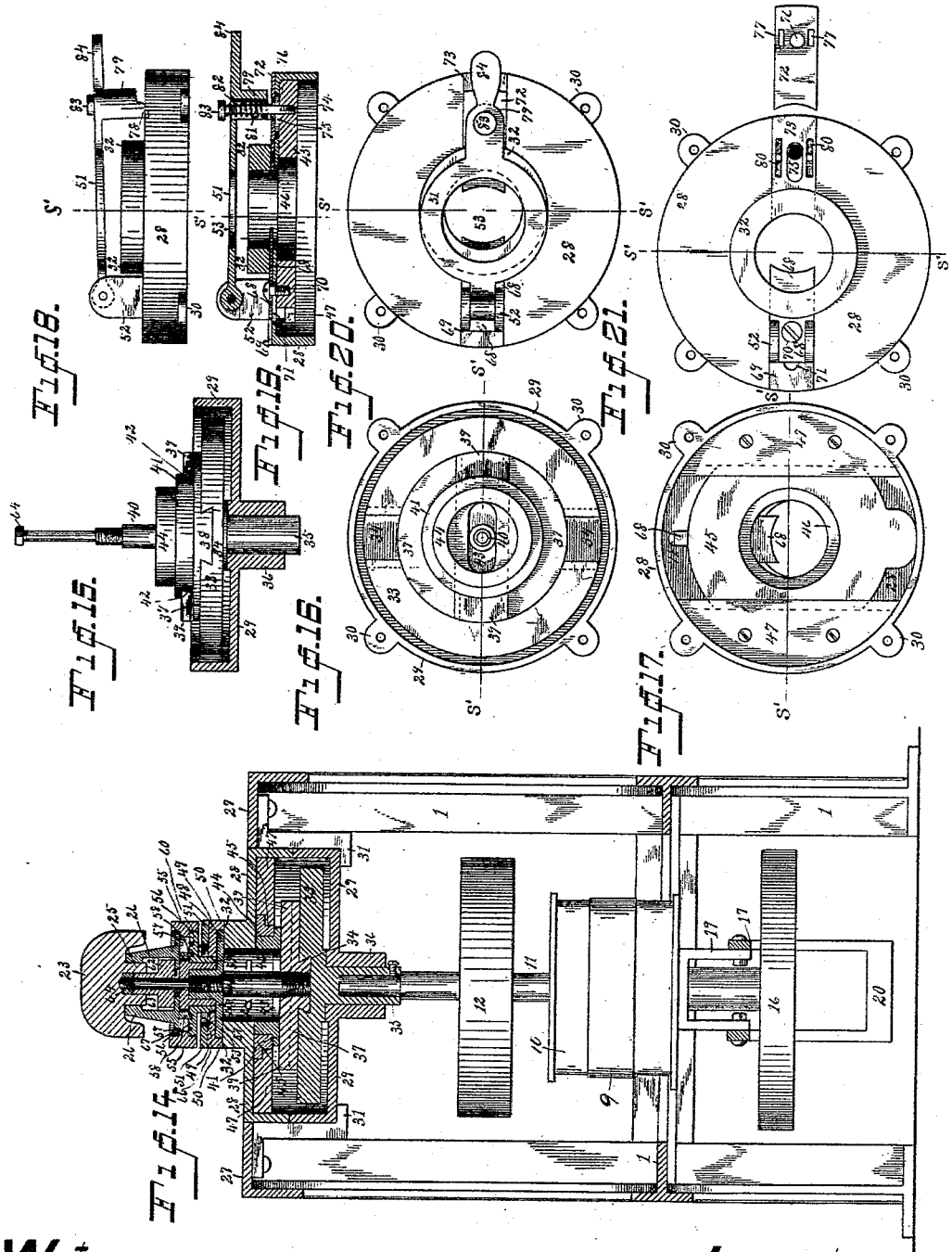
Witnesses
C. M. Newman,
Bertha C. Lee.
Inventor
John B. Howe
By A. M. Wooster
Atty.

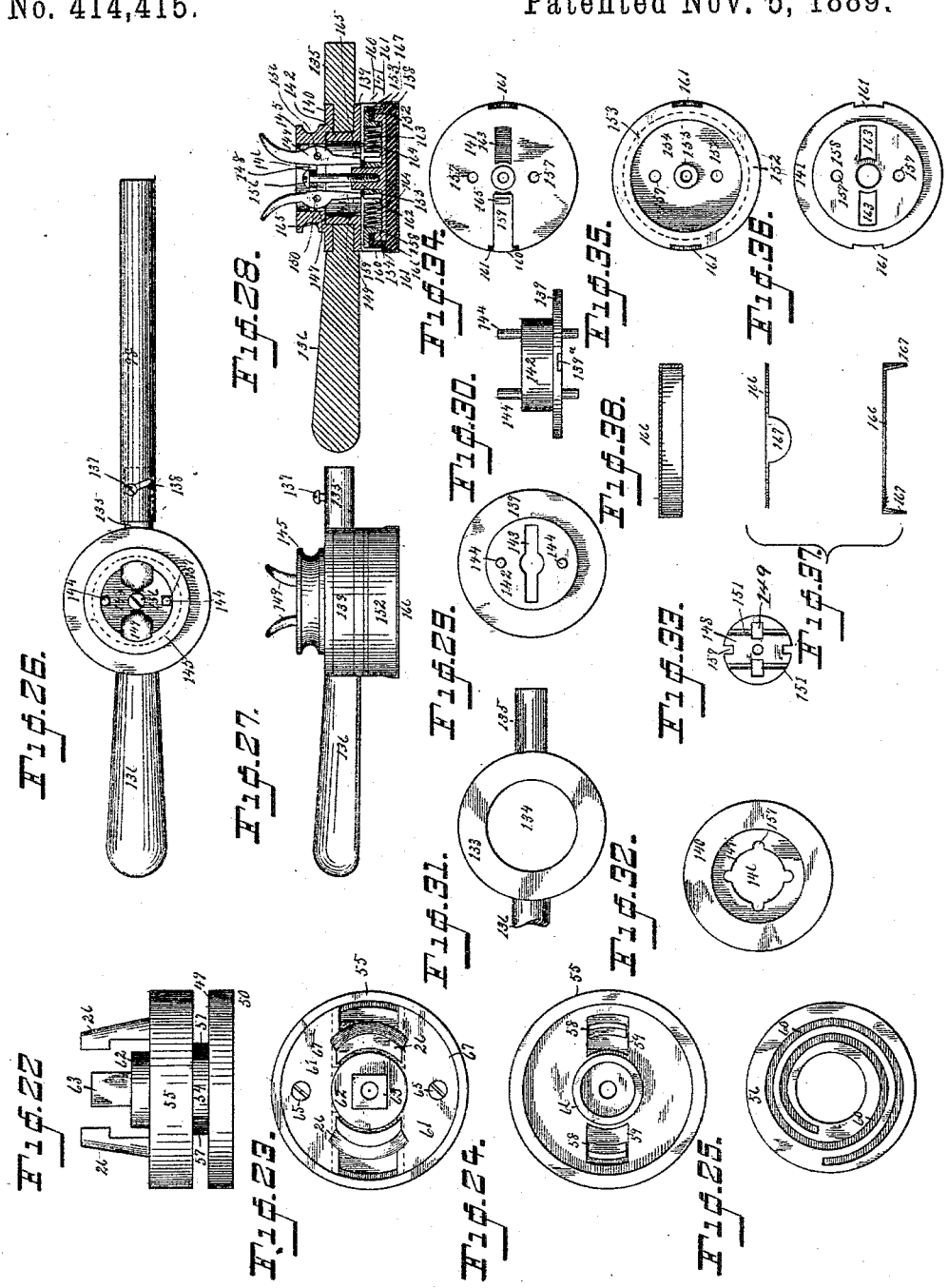

UNITED STATES PATENT OFFICE.

JOHN B. HOWE, OF DANBURY, CONNECTICUT.

HAT-POUNCING MACHINE.

SPECIFICATION forming part of Letters Patent No. 414,415, dated November 5, 1889.

Application filed December 26, 1888. Serial No. 294,605. (No model.)

*To all whom it may concern:*

Be it known that I, JOHN B. HOWE, a citizen of the United States, residing at Danbury, in the county of Fairfield and State of Connecticut, have invented certain new and useful Improvements in Hat-Pouncing Machines; and I do hereby declare the following to be a full, clear, and exact description of the invention, such as will enable others skilled in the art to which it appertains to make and use the same.

My invention has for its object to produce an automatic machine for pouncing the crowns and both sides of the brims of hat-bodies. So far as I am aware no machine has heretofore been constructed upon which the brims could be pounced, that operation being performed by hand, the crowns being pounced on a machine, the ordinary method being to place the bodies upon a block, then to rotate the block and apply the sand-paper by hand, the spindle by which the block is carried rotating either in the horizontal plane or in a plane at an oblique angle thereto. In my present machine the spindle is preferably caused to rotate in the vertical plane, and the sand-paper or other pouncing material is carried by rotating heads, the motion of the sand-paper in pouncing both crowns and brims being rotary. This is a novel and very important feature of my invention, for the reason that the quality of the work is greatly improved, most of the loose hairs being cut off, so that but little singeing is necessary, and, moreover, the hats are pounced with great rapidity—so rapidly, in fact, as to produce a great saving in the cost of manufacturing hats.

I will now describe the entire machine and its mode of operation, referring by numbers to the accompanying drawings, forming part of this specification, in which—

Figure 1 is a side elevation of the entire machine, the view being from the left as seen in Fig. 4 and the right as seen in Fig. 3; Fig. 2, a side elevation of the entire machine, the view being from the opposite side to that in Fig. 1; Fig. 3, a rear elevation; Fig. 4, a front elevation; Fig. 5, a section on the line *x x* in Fig. 1, looking toward the left; Fig. 6, a section on the same line looking toward the right; Fig. 7, a section on the line *y y* in Fig. 1, looking down. Figs. 8 and 9 are respectively a plan view and a side elevation, on an enlarged scale, of the upper and lower slides carrying the belt-pulleys which drive the pouncing-heads. Figs. 10 and 11 are detail views of parts of the slide detached; Fig. 12, a view, on an enlarged scale, of one of the guide-rods, the sliding tube being in section and the position of the parts corresponding with Fig. 1; Fig. 13, a section of the guide-rod on the line *z z* in Fig. 1, looking down; Fig. 14, a section on the line *s s* in Fig. 1, looking toward the front of the machine, said line being also indicated in Fig. 7. Figs. 15 to 21, inclusive, are detail views illustrating the construction of the lathe. In order that the position of the parts illustrated in these detail views may be clearly understood when assembled, as in Fig. 14, I have indicated the section-line of Fig. 14 in each of the said views by *s'*. Figs. 22 to 25, inclusive, are detail views illustrating the construction of the chuck, which also appears in section in Fig. 14. Figs. 26, 27, and 28 are respectively a plan view, elevation, and longitudinal section of one of the pouncing-heads. Figs. 29 to 36, inclusive, are detail views illustrating the construction of the pouncing-heads. Fig. 37 illustrates in two edge views one shape to which I cut the pieces of sand-paper for use in the pouncing-heads. Fig. 38 is a section illustrating another shape in which the pieces of sand-paper may be cut; Fig. 39, an elevation of the shank of the pouncing-head, showing a guard-plate attached thereto, which I slide forward to protect the pouncing-head in singeing, and which also acts to prevent the brims from curling. Figs. 40 and 41 are elevations, partly in section, of the pouncing-head and guard-plate, the former showing the guard-plate in operative position, and the latter at its retracted position; Fig. 42, an end view of the shank of the pouncing-head and the guard-plate corresponding with Fig. 39; and Fig. 43 is a bottom view of the shank of the pouncing-head, showing the slots and openings by which the guard-plate is locked, either in the operative or retracted position.

Similar numbers denote the same parts in all the figures of the drawings.

The various portions of the frame-work are designated by 1. It will of course be apparent that the special design of the frame-work is not of the essence of my invention.

2 denotes the shaft of the machine, to which power is applied by belts 3, which extend from a main or counter shaft (not shown) and are adapted to run over tight pulleys 4 and loose pulleys 5 on shaft 2. As it is necessary to reverse the movement of this shaft each time a hat is placed on the chuck or removed therefrom, it is of course necessary that one of the belts should be crossed.

6 denotes the belt-shifters, and 7 levers by which they are operated. Turning for an instant to Fig. 3, suppose that the pulley at the right is a tight pulley and that the direction of movement is away from the point of view. A movement of the right lever 7 would shift the belt to the right loose pulley, which would stop the machine, the pulley at the extreme left being a loose pulley. Suppose, now, that it is desired to start the machine in the opposite direction. The left lever 7 is operated to throw the left—that is, the crossed—belt, as shown in the drawings, from the left loose pulley to the left tight pulley, which would instantly start the machine to running in the opposite direction. Levers 7 are attached to rock-shafts 21, which extend along the opposite sides of the machine, (see Fig. 1,) each rock-shaft being provided at its front end with an operating-handle 22.

8 denotes a fixed pulley on shaft 2, and 9 a belt extending from said pulley to a pulley 10 on the lathe-spindle 11.

12 denotes another pulley on spindle 11, and 13 a belt extending from said pulley to pulley 14 on a shaft 15, which drives the pouncing-heads, all of which will presently be fully explained. The lathe-spindle and shaft 15 are suitably journaled in the frame-work of the machine, the special details not being of the essence of my invention. The upper box of shaft 15, which appears in Figs. 1, 3, and 4, is designated 18. At the lower end of the lathe-spindle is a fly-wheel 16, the edge of which is engaged by a bifurcated brake 17, which is pivoted to a yoke 19 on the frame-work. The rear end of the brake is extended inward, as shown in Fig. 1, or else weighted, so as to serve as a counter-balance to hold the brake in its normal position. When it is desired to stop the rotation of the lathe-spindle, the foot of the operator is placed upon foot-piece 20 and pressed downward.

23 denotes a hat-block of ordinary construction, and 24 in Fig. 2 a hat-body upon the block, the body being omitted in the other figures for the sake of clearness in illustration.

It will of course be understood by those familiar with the art of hat-making that each completed hat-body is placed upon a block, upon which it remains during the various operations of finishing, the operation of blocking being the last one in the forming of a hat-body. The first step in the operation of pouncing is to secure the block with the hat-body upon it in position on the machine. The blocks are grasped and held by a mechanism called in the art a "chuck," and the required eccentric motion is given to the block and body by a mechanism called in the art a "lathe."

I will now proceed to describe my novel chuck and lathe.

In the under side of the block is a circular recess having a hub 25 at the center. This hub is grasped by the jaws 26 of the chuck.

27 denotes a top plate which forms a portion of the frame-work.

The lathe mechanism is all contained within a two-part case, the upper and lower parts being designated, respectively, as 28 and 29. These parts are both provided with ears 30, and are bolted firmly together, the case as a whole resting on brackets 31, secured to the top plate. The upper part of the case is provided with a raised circular flange 32. All of the parts above this flange, taken together, constitute the chuck.

In practice the lathe-spindle, and with it the chuck and hat-body, rotates with sufficient speed, so that it is necessary that the surface of the body as it is acted upon by the pouncing-heads should turn in a perfect circle; otherwise the quarters of the bodies would be worn away by the pouncing-heads and the intermediate portions not acted upon at all. It is necessary, therefore, to give to the block such an eccentric motion as will cause the portion of the body that is being acted upon to pass a fixed point—for example, pouncing-heads—with a circular motion. This is accomplished by imparting an eccentric movement to the hat-block by means of the lathe mechanism.

33 denotes the lower disk of the lathe, which is provided with a dovetail groove 34 across its upper face. Upon the under side of this disk is a trunnion 35, which is rigidly attached to the upper end of the lathe-spindle in any suitable manner, ordinarily by a set-screw. This trunnion is journaled in a sleeve 36, projecting downward from the lower part of the case. Just above disk 33 is an intermediate disk 37, having a dovetail 38 on its under side, engaging the groove in disk 33. Disk 37 is provided with a dovetail 39 on its upper side, lying at right angles to dovetail 38.

40 denotes the chuck-spindle, which projects upward from the center of plate 37. It will thus be seen that by adjusting disk 37 at any position except concentric with disk 33 the chuck-spindle, in addition to its axial rotation, will rotate about an imaginary line, which is a continuation of the axis of the lathe-spindle, as will be more fully explained. Just above disk 37 is another disk 41, having a dovetail groove 42 on its under side, which engages dovetail 39 upon disk 37.

43 is a straight slot in disk 41, closed at both ends and extending into groove 42, being longitudinal therewith, through which the chuck-spindle passes, and 44 is a concentric upwardly-extending flange, by which the parts are operated, as will presently be explained. These parts are clearly shown in Fig. 14, and also in Fig. 16, which is a plan view of the lower half of the case and the parts within it, Fig. 17 being an inverted plan view of the upper part of the case, and the parts lying therein when assembled. Just above the upper disk is a slide 45, having a central opening 46, which receives flange 44 on the upper disk 41. This slide is adapted to move in guides 47, secured to the under side of the upper part of the case. (See Figs. 14 and 17.) The function of this slide is to throw the lathe on and off the center. The lathe is brought to the center when it is desired to place a block and body on the chuck or to remove it therefrom. The long diameter of an ordinary hat-body is usually one and three-fourths inch greater than the short diameter. In order to compensate for this difference and cause the sides and ends of the hat to approach the pouncing-heads in the same circle as the quarters, it is necessary to throw the chuck seven-eighths of an inch from an imaginary line in continuation of the axis of the lathe-spindle. The block is placed upon the chuck at right angles to the line of movement of the jaws, the diameter of the block shown in Fig. 14 being the short diameter, and the same position of the block being shown in Fig. 7. As already stated, the slide is engaged by flange 44 on the upper disk. In practice the slide is forced in one direction to bring the chuck-spindle to the center and in the opposite direction to throw it from the center. When the chuck-spindle is to be thrown from the center—that is, away from the position in which the parts are shown in Figs. 14, 15, 16, and 17—the slide is simply forced in the required direction—that is, away from the point of view in Figs. 14 and 15 and in the direction of the top of the sheet in Figs. 16 and 17. As the slide is moved it carries the upper disk, and the latter carries the intermediate disk, and with it the chuck-spindle, dovetail 38 sliding freely in groove 34, and the upper disk carrying the intermediate disk through the engagement of dovetail 39 with groove 42, the two grooves and dovetails being at right angles to each other, as clearly shown. As the special manner in which the slide is manipulated has quite as much relation to the chuck mechanism as to the lathe mechanism, I will describe it later in connection with the chuck mechanism.

I think the operation of the lathe mechanism will be readily understood from the description given. It will be apparent that the lower disk rotates concentrically with the lathe-spindle, and that the position of the upper disk relatively to the lower disk is fixed for each pouncing operation and is not changed during said operation. This upper disk, being held by the slide, can have no movement independently of the slide except its rotary movement, it being understoood that flange 44 upon the upper disk turns freely within opening 46 in the slide. The center of rotation of the upper disk is eccentric to the center of rotation of the lower disk when the chuck-spindle is thrown from the center. In operation the center of rotation of the upper disk is seven-eighths of an inch from the center of rotation of the lower disk at the instant of time that the sides of the crown or brim of the hat-body are being acted upon by the pouncing-heads and is concentric with the center of rotation of the lathe-spindle at the instant of time that the ends of the crown or brim of the hat-body are being acted upon by the pouncing-heads. It follows, therefore, that during each revolution of the lower disk the intermediate disk must move transversely across its face and back again, sliding freely in groove 34, and also that dovetail 39 on the upper side of the intermediate disk must move forward and back in groove 42 in the upper disk, the chuck-spindle moving forward and back in slot 43 in the upper disk, the cross-movement of the intermediate disk relatively to the upper disk being at right angles to its movement relatively to the lower disk, and the distance between its two extremes of movement being one and three-fourths inch—that is, just the difference between the long and short diameters of the hat-block. The necessity for this peculiar movement will be apparent from the fact that owing to the high speed at which the block and hat-body are rotated it would be impossible to make the pouncing-heads follow the contour of the body. It is therefore necessary to present each portion of the hat-body to the pouncing-heads, the latter being held stationary instead of moving the latter to conform to the oval of the block. Just above flange 32 upon the upper part of the lathe-case is a plate 48, having a hub which is threaded to engage the chuck-spindle, as clearly shown in Fig. 14, the lower side of the plate resting against a shoulder on the spindle. This plate serves as a cover to the opening into the lathe-case and runs freely within a friction-plate 49, the flange 50 of which is adapted to bear upon the top of flange 32 to lock and unlock the chuck-jaws when the motion of the spindle is reversed, as will presently be fully explained. It should be noted that the opening in the under side of the friction-plate is deep enough so that there is no engagement of plate 48 either with the friction-plate or with the top of flange 32. Next above the friction-plate, as seen in Fig. 14, is the clamping-lever 51, which is pivoted to ears 52 upon a slide 68, which moves in a groove 69 in the upper part of the lathe-case. This clamping-lever is provided with a large central opening 53, through which the chuck-spindle and other parts of the chuck mechanism pass freely—that is, without any obstruction—no matter what may be the position of the clamping-lever. (See Figs. 18, 19, and 20, in connection with Fig. 14.)

For convenience in description I will pass on to other portions of the chuck mechanism, and will describe the specific construction and operation of the clamping-lever and the parts moving in connection therewith later on.

It will be understood from Fig. 14 that the friction-plate is provided with a central opening, and from Fig. 22 that it is provided with upwardly-extending lugs 54, one only being shown in said figure, which is a detail elevation, the position of the parts corresponding with Fig. 14, with the exception that the clamping-lever is omitted for the sake of clearness. Next above the clamping-lever, as seen in Fig. 14, (see also Fig. 22,) is the jaw-carrier 55, having in its under side a recess to receive the scroll-plate 56. The scroll-plate is also provided with downwardly-projecting lugs 57, which extend down between lugs 54 on the friction-plate, as clearly shown in Fig. 22, thereby locking the scroll-plate and friction-plate together, so that both must rotate in the same direction, as will be more fully explained. It will be seen from Fig. 14, in connection with Fig. 22, that lugs 54 and 57 upon the friction-plate and scroll-plate engage a downwardly-projecting hub 66 upon the jaw-carrier, being adapted to turn thereon, the two pairs of lugs completely encircling said hub, which in turn engages the hub upon plate 48 and is adapted to turn thereon. The bases of the jaw slide upon the jaw-carrier and are provided with downwardly-extending lugs 58, which pass through slots 59 in the jaw-carrier and engage the scroll-grooves 60 in plate 56. The jaws are held in place in the jaw-carrier by a covering-plate 61, which is undercut to receive the bases of the jaws, (see dotted lines in Fig. 23,) and is provided with a central hub 62 and a squared extension 63, through which the chuck-spindle passes, and which is adapted to engage a corresponding opening in the hub 25 of the hat-block. (See Fig. 14.) These parts are all held in position by a nut 64, which engages a screw-thread at the upper end of the chuck-spindle and is screwed down tight upon extension 63. The covering-plate fits down within a recess 67 in the upper side of the jaw-carrier, and is held in position by screws 65, the surfaces of the jaw-carrier and covering-plate being flush. (See Figs. 22 and 25, the latter being a plan view of the jaw-carrier and jaws. See also in this connection Fig. 24, which is an inverted plan view of the jaw-carrier, and Fig. 25, which is a plan view of the scroll-plate, showing the scroll-groove, which is engaged by lugs 58, extending downward from the jaws when the parts are assembled.)

Turning now to Figs. 14, 18, 19, 20, and 21, I will describe the operation of clamping-lever 51 and slide 45, by which the chuck-spindle is thrown from the center, as already described. As has been stated, the ears to which the clamping-lever is pivoted are carried by a slide 68, moving in a groove 69 in the upper part 28 of the lathe-case. This slide is rigidly connected to slide 45 by means of a screw 70, which passes through a slot 71 in the lathe-case, slide 68 acting to cover said slot to prevent the dirt and refuse produced by the machine from passing through and getting into the lathe-case. (See Figs. 19 and 20.) Upon the opposite side of part 28 is a corresponding slide 72, moving in a groove 73, corresponding with groove 69. Slide 72 is connected to slide 45 by means of a screw-pin 74, which passes through a slot 75 in part 28, corresponding with slot 71, the lower end of said screw-pin engaging slide 45 rigidly. The hole in slide 72, through which the screw-pin passes, is denoted by 76. (See Fig. 21.) On the opposite sides of this hole are slots 77, which are engaged by lugs 78 on the under side of a head 79 at the outer end of the clamping-lever.

80 (see Fig. 21) denotes two pairs of sockets in the upper plate of the lathe-case, either pair of sockets being adapted to register with slots 77 in plate 72, as will presently be more fully explained.

Within head 79, I provide a socket 81, which receives a spring 82, coiled about the screw-pin, the upper end of said spring bearing against the head 83 of the screw-pin and the lower end bearing against the base of the socket, as is clearly shown in Fig. 19. The action of this spring is to force lugs 78 downward, causing them to engage either pair of sockets 80 when said sockets register with slots 77, in which the lugs rest. In practice sockets 80 are made deeper than the length of lugs 78, so that said lugs will not touch the bottom thereof, spring 82 acting simply to engage the lugs with the sockets, but not with sufficient power to cause the clamping-lever to engage the friction-plate, as will be more fully explained. The end of the clamping-lever is extended outward, forming a handle 84, by means of which it is raised to unlock and by which pressure is applied to the clamping-lever when it is desired to cause friction-plate 49 to engage flange 32 upon the lathe-case. Fig. 18 shows the clamping-lever in the raised position. Slide 72 serves the same purpose as slide 68—that is, it covers the slot through which the screw-pin passes, and also the sockets 80, so that it is impossible for dirt and the refuse produced by the machine to get down into the lathe-case. The inner ends of these slides are curved inward, as shown, so as not to interfere with the throwing of the chuck-spindle off the center. In order to avoid repetition, I will postpone the description in detail of the operation of this portion of the machine, and will at the end of the specification give a full description of the operation of the entire machine from the time a hat-block with a body thereon is placed in the chuck to its removal therefrom after the operation of pouncing has been completed.

Turning now to Figs. 8, 9, 10, and 11, in connection with the general views, I will describe the construction of the pouncing-heads and the mechanism by which they are supported and operated.

Each of the pouncing-heads is supported by an independent carrier. (See for illustration of the carriers complete, but detached, Figs. 8 and 9.) The forward ends of these carriers engage and slide on vertical rods 85, and the rear ends engage and slide on vertical rods 86. These rods are rigidly supported in the general frame-work of the machine, (see Figs. 5 and 6,) and also in a plate 87, supported by standards 88, the bases of which are bolted to top plate 27. The main plate of each of the carriers is preferably made in two parts, the forward part being designated as 89 and the rear part as 90, said parts being matched together and secured by a bolt 91.

92 denotes the cap-plate of each of the carriers, which is secured thereto by bolts 93.

94 denotes a circular recess in each of the carriers, and 95 a hub on which the carrying-plate 96 of the pouncing-head is journaled. Each carrying-plate is provided with a stump 97, to which the tubular shank 98 of the pouncing-head is connected ordinarily by a set-screw at 99, as shown in Figs. 40 and 41.

100 denotes a belt-pulley upon each carrier, which is provided with a sleeve 101, having a key or spline 102, (see Fig. 8,) which is adapted to engage a corresponding groove (see Figs. 4 and 7) in shaft 15. Sleeve 101 passes freely through the opening in hub 95, and is provided at its outer end with a collar 103, by which the belt-pulley and sleeve are held in position, the belt-pulley moving with the carriers freely up and down on shaft 15.

It will be readily understood from the drawings that there are two pouncing-heads, one above the other, each being connected to an independent carrier. (See Figs. 2, 4, and 6.) It will be noticed, furthermore, that I place the belt-pulley of the upper carrier upon the upper side and the belt-pulley of the lower carrier upon the lower side thereof, Fig. 8 being a plan view of the upper carrier, and Fig. 9 an elevation of the lower carrier.

104 denotes the openings in the carriers for rods 85, and 105 the openings for rods 86. It will be apparent from Fig. 6 that the two carriers are supported and guided alike by rods 85.

106 denotes coil-springs surrounding rods 85, the lower ends of which rest upon the frame-work, and upon the upper ends of which the lower carrier rests when at its lowest position, and 107 denotes similar springs, the lower ends of which rest upon the lower carrier, and upon the upper ends of which the upper carrier rests when at its lowest position. These springs simply act as buffers and prevent any shock or jar to the machine when the carriers are moved down quickly. The carriers are moved upward and downward upon the vertical rods and retained at any position in which they may be placed by mechanism which I will now describe.

108 denotes tubes, which slide freely up and down on vertical rods 86, bushings 109 being preferably interposed between the tubes and the rods to reduce the contact portion. Each of these tubes is rigidly connected to one of the carriers by a set-screw 110, the other tube being disconnected to that carrier, but connected to the opposite carrier—that is to say, each carrier is rigidly connected to one tube and slides freely over the other tube, as is clearly shown in Fig. 5, in which the upper carrier is shown as rigidly connected to the right tube, but sliding freely over the left tube, and the lower carrier as rigidly connected to the left tube, but sliding freely over the right tube.

It may be stated here by way of explanation that the lower pouncing-head, which is carried by the lower carrier, is ordinarily used only to pounce the under side of the brim of a hat-body, the upper side of the brim and the crown being acted upon by the upper pouncing-head, all of which will presently be fully explained. It will be seen, therefore, that there can be no possible disturbance of the movements of either, as neither is required to pass into the field of the other.

The rear part 90 of the main plate of the carrier is provided with half-sockets 111 to receive tubes 108, the corresponding half-sockets being formed in a plate 112, which is secured to part 90 by bolts 113, the opening being denoted by 105. Set-screws 110, which lock the carriers, respectively, to tubes 108, pass through the half-sockets in part 90, one of said set-screws being shown in Fig. 8 and both appearing in Fig. 5. It is of course desirable in use that the carriers be so balanced that the pouncing-heads may be readily moved to any plane in which they are required to operate, or may be readily placed out of operative position, and that they will stay just where they are placed without requiring any supplemental locking or retaining devices. This result I accomplish by mechanism which I will now describe.

As already stated, each pouncing-head is connected to an independent carrier and tube. At the upper and lower ends of the tubes are placed clips 114. These clips embrace the tubes, being slotted at their inner ends and provided with bolts and nuts 115, whereby they are tightened up and made to clamp the tubes firmly. At the outer end of one of these clips is a squared opening 116, which receives the shank 117 of a yoke 118. At the end of the shank is a threaded portion engaged by a nut 119.

120 denotes wheels suitably journaled in the frame-work, each carrier and pouncing-head being controlled by a wheel independently of the other.

121 denotes a wire, chain, or strap encircling each wheel and preferably lying in a groove in the periphery thereof, the ends of said wire crossing each other and being connected, respectively, to the upper and lower clips, as shown in Fig. 12. One end of the wire is ordinarily provided with an eye and is locked by a bolt 122, passing through the eye and through the clip. The other end of the wire is connected to yoke 118, said yoke being tightened up to stretch the wire by means of nut 119. The wire is clamped tightly upon the opposite sides of the wheels by clamps 123. (See Figs. 1 and 2.)

124 denotes the hubs of the wheels, and 124ª studs to which the hubs are locked by set-screws or in any suitable manner. These studs pass through standards 88 and through collars 125, bolted to the standards, in which they are journaled.

126 denotes angle-levers rigidly secured at the outer ends of the studs by set-screws 127, the studs being held in operative position by nuts 128 at their outer ends. It will therefore be seen that each wheel and the corresponding stud and angle-lever must oscillate together.

129 denotes a weight connected to the horizontal arm of the angle-lever. The vertical arm of each angle-lever is pivoted to an operating-rod 130, (an angle-rod,) as shown in the drawings. These rods extend toward the forward end of the machine, are supported in guides 131, (see Fig. 4,) and are provided at their outer ends with handles 132, which turn inward toward each other, as shown in Figs. 4 and 6, so that both carriers, when used, may be adjusted with one hand, leaving the other hand for manipulating the pouncing-heads.

Turning now to Figs. 26 to 37, inclusive, I will describe the construction of the pouncing-heads. (See also in this connection Fig. 7, which shows the upper pouncing-head in operative position as when operating upon the crown of a hat-body and the lower pouncing-head as thrown out of operative position.) The tubular shank (denoted by 98) is secured to stump 97 in any suitable manner—for example, by a set-screw, as shown in Fig. 40. At the outer ends of the tubular shanks the pouncing-heads are secured in a manner which I will presently explain.

Fig. 26 is a plan view, Fig. 27 a side elevation, and Fig. 28 a central section, of one of the pouncing-heads, Figs. 29 to 37, inclusive, being detail views of the various parts detached.

133 denotes the holding-plate, having a central opening 134, a stump 135, and a handle 136 for convenience in operation. Stump 135 is engaged by a screw-pin 137, passing through an oblique slot 138 in the tubular shank, (see Fig. 26,) said slot being made sufficiently long to permit the pouncing-head to be turned a full quarter around independently of the tubular shank, the obliquity of the slot compensating for the twisting of the belt, as will presently be explained. It will be noticed (see Figs. 3 and 4) that the handle 136 of the lower pouncing-head is curved, or both handles may be curved toward each other, if preferred, so that both pouncing-heads may be manipulated with one hand in pouncing brims.

139 denotes the central plate of the pouncing-head, 140 the upper plate, and 141 the lower plate. The central plate is shown in plan in Fig. 29 and in elevation in Fig. 30. It is provided with a hub 142, which engages the opening in the holding-plate, with a slot 143, through which the jaw-operating levers pass, and with centering-pins 144, projecting both upward and downward, which pass through the various parts of the pouncing-head. The upper plate lies over the central plate and engages the end of hub 142, as clearly shown in Fig. 28.

145 denotes the belt-pulley, which is made integral with the upper plate. 146 denotes a central opening extending through this plate and through the belt-pulley, 147 a flange within said opening, 148 a plate resting on this flange, and 149 the jaw-operating levers pivoted in slots in said plate. In order to give the greatest possible strength, these levers are pivoted on pins 150, lying in grooves 151 in the under side of plate 148, (see Fig. 33,) which is an inverted plan view of said plate.

Fig. 32 is an inverted plan view of the upper plate, showing clearly the flange upon which plate 148 rests. The upper ends of levers 149 are curved outward for convenience in operation, and their lower ends extend downward to engage the jaws, as will presently be explained. Fig. 34 is a plan view of the lower plate, one of the jaws being in position; Fig. 35, a plan view of the rubber disk in position on the flanged plate, and Fig. 36 an inverted plan view of the lower plate.

152 denotes a disk, preferably made of soft rubber, and having formed integral therewith an inwardly-turned raised lip 153.

154 denotes a flanged plate, over which lip 153 is sprung, and by which the rubber disk is held securely in position. This plate is provided with an upwardly-extending hub 155, internally threaded to receive a screw 156, which passes through plate 148, down through the entire pouncing-head, and engages hub 155 to hold the parts in position. The upper plate, lower plate, and flanged plate are all provided with holes through which the centering-pins pass, said centering-pins acting to hold the parts in proper position relatively to each other. The edge of the lower plate 141 extends over lip 153, and when the parts are assembled the lip is locked firmly between said plate and the flange of plate 154. Upon the under side of plate 141 is a hub 158, which extends down within the lip of the rubber disk, and also within the flange of plate 154, as is clearly shown in Fig. 28.

159 denotes the jaws, the outer ends of which are provided with downwardly-extending lips 160, which, when drawn inward, lie in recesses 161 in the outer edge of the lower plate and the rubber disk. (See Figs. 28, 35, and 36.) At the inner ends of the jaws, upon the under sides thereof, are lugs 162, which extend downward into recesses 163 in the lower plate. Springs 164 lie in said recesses and bear against the outer ends of said recesses and against lugs 162, thereby acting to hold lips 160 drawn into recesses 161, the purpose of which will presently be fully explained. Upon the upper ends of the jaws, near their inner ends, are lugs 165, which are engaged by the lower ends of the jaw-operating levers 149, as clearly shown in Fig. 28. It will be seen from this figure that when the upper ends of the jaw-operating levers are pressed inward toward each other the jaws are necessarily moved outward, and that as soon as the fingers of the operator are removed springs 164 will act to draw the lips into recesses 161 again. Recesses 139ᵃ are preferably formed in the under side of plate 139 to receive the jaws. (See Fig. 30.)

166 (see Fig. 37) is a disk of sand-paper, which is provided with ears or tabs 167 on opposite sides thereof. These disks and the tabs are cut by suitable punches, not essential parts of my present invention, and the tabs are bent backward at right angles to the sanded side of the paper. These tabs or ears are adapted to lie in recesses 161 in the edges of the rubber disk and lower plate, and are clamped firmly in said recesses by the lips at the outer ends of the jaws. It will be seen, therefore, that to remove a piece of sand-paper and insert another piece it is simply necessary to press the upper ends of the jaw-operating levers inward toward each other, which will throw their lower ends outward, carrying lips 160 out of recesses 161 and permitting the piece of sand-paper to drop out. Another piece is then inserted, the tabs being placed in said recesses and the fingers of the operator removed from the jaw-operating levers. Springs 164 will then act to draw the jaws inward again and clamp the tabs in the recesses. In Fig. 38 I have illustrated another shape in which the sand-paper may be cut. In this form I simply cut the disk larger, its diameter being the same as a diameter including the tabs in the other form. In this form the outer edge of the disk is simply crimped up like a box-cover, as is clearly indicated in Fig. 38. This form of sand-paper disk is attached in precisely the same manner as the other. The form illustrated in Fig. 37 is preferred, however, for the reason that in cutting large quantities of the disks there is a great saving in the amount of paper required.

168 denotes the belts by which the pouncing-heads are driven. These belts engage pulleys 100 upon the carriers (see Figs. 7, 8, and 9) and pulleys 145 upon the pouncing-heads. (See Figs. 26, 27, and 28.

It will of course be understood by those familiar with the art that the operation of pouncing hat-bodies is a very delicate one, that it is absolutely essential that the pouncing action upon all portions of the crown and brim should be uniform, and that unless great care is taken portions of the body will not be acted upon sufficiently and other portions will be worn away too much. It is therefore necessary that the action of the pouncing-heads should be perfectly regular.

It will be apparent that when the upper pouncing-head is acting upon the upper side of the brim of the hat-body the upper belt 168 will lie straight, but that when it is acting upon the side of the crown the pouncing-head will be turned to a plane at right angles to its plane when operating upon the brim, as is clearly shown in Fig. 7. In order to turn the head to this position it is necessary to twist belt 168. This of course, unless compensated for, would shorten the belt slightly and tend to make it too taut in one position and too loose in the other. In order to avoid either of these results, I attach the upper pouncing-head to the upper tubular shank, in the manner illustrated in Fig. 26 and already referred to in the specification—that is, by the screw-pin 137, which passes through an oblique slot 138 in the tubular shank and engages stump 135 of the holding-plate. (See Fig. 26.) It will be seen that when the upper pouncing-head is turned from the position shown in Fig. 26 to that shown in Fig. 7 the engagement of the screw-pin with the oblique slot will draw the pouncing-head inward slightly, so that the shortening of the belt by twisting will be compensated for, and the tension of the belt will be kept uniform in the different positions.

It will of course be understood from the description heretofore given that the engagement of belts 168 with pulleys 100 and 145 causes the rotation of the entire pouncing-head within the holding-plate, which I have designated by 133, the operator in use controlling the pouncing-heads by means of handles 136.

In Figs. 39 to 43, inclusive, I have illustrated the construction and application of a guard-plate which I use when it is found necessary to singe the brims. The flame by which the singeing is accomplished causes the brims to roll and cockle up. In order to hold the brims firmly in position and prevent them from rolling under the influence of the heat, and also to protect the pouncing-heads from the heat, I provide guard-plates 169, having shanks 170, connected to blocks 171, which are adapted to slide within the tubular shanks 98.

172 denotes slots in the upper and under sides of the tubular shanks, enlargements 173 being provided at the ends of one of the slots. (See Fig. 43.)

174 denotes a sliding sleeve upon the outside of the tubular shank, and 175 a yoke attached to the shank of the guard-plate which lies outside of the sleeve. A pin 176 passes through a stump 177 on the shank, through both slots in the tubular shank, the block 171, the sliding sleeve, and through the top of the yoke, as is clearly shown in Figs. 40 and 42. A spring 178, surrounding the pin and bearing against the under side of the top of the yoke and the top of the sliding sleeve, acts to draw the shank and guard-plate upward and to engage stump 177 with either of the enlargements 173 to lock the guard-plate in the operative position, as in Fig. 40, or at its retractive position, as in Fig. 41.

179 is a spring within the tubular shank, one end of which is connected to the sliding block and the other to stump 97 upon carrying-plate 96, as clearly shown in Fig. 40. The action of this spring is to draw the guard-plate to its retractive position, and the action of spring 178 is to lock it there, as clearly shown in Fig. 41. When the guard-plate is moved forward to its operative position, as shown in Fig. 40, spring 178 also acts to lock it in that position by drawing stump 177 into the enlargement at the outer end of the slot 172.

The operation of the entire machine is as follows: The placing of the hat-body upon the block has nothing to do with my present invention. The bodies are brought to the machine already blocked. Starting with the lathe-spindle stationary, the chuck-spindle on its center—that is, in line with the lathe-spindle—and the jaws of the chuck in the open position—that is, as shown in Fig. 14—the block with the hat-body upon it is placed in position transversely to the line of action of the jaws—that is to say, hub 25 of the block is placed between the jaws, squared extension 63 engaging the opening in the hub, and the long diameter of the block lying transversely to the line of action of the jaws. The operator then, by placing one hand on one of the operating-handles 22, turns one of the rock-shafts 21, which operates a belt-shifter and throws one of the main belts from a loose to a tight pulley and starts the lathe-spindle rotating in the forward direction. Simultaneously with this movement, or an instant later, the other hand of the operator is placed upon handle 84 of clamping-lever 51. The first movement of this handle is to raise the clamping-lever slightly against the power of spring 82 to disengage lugs 78 from sockets 80 in the lathe-case, leaving said lugs engaged in slots 77 in slide 72, this position being shown in Fig. 18. The clamping-lever is then forced inward—that is, toward the center of the machine—carrying slides 68, 72, and 45, and also carrying the chuck-spindle off the center through the engagement of flange 44 on the upper disk with the slide, it being of course understood that at this moment the dovetailed groove in the lower disk will lie longitudinally with the long diameter of the hat-block, and that the dovetail upon the upper side of the intermediate disk, which is engaged by the upper disk, will lie transversely thereto, so that the upper disk will move freely with the slide. As soon as the slide and upper disk have been moved inward to the desired position the clamping-lever is pressed downward again and lugs 78 are engaged in the inner pair of sockets 80 in the lathe-case, thereby locking the parts in this position. This places the lathe mechanism in proper position to produce the special movement required for the pouncing operation. The jaws of the chuck, however, will not yet have grasped the hat-block to hold it firmly. The operator therefore continues to press downward upon the clamping-lever for an instant, which presses friction-plate 49 downward and causes flange 50 to engage flange 32 upon the upper part of the lathe-case. This retards the rotation of the friction-plate and also of scroll-plate 56, said friction-plate and scroll-plate being locked together through the engagement of lugs 54 and 57. It will be understood that all parts of the lathe and chuck commence their proper movements the instant the main belt is shifted from the loose pulley to the tight pulley, the jaws being carried around by the jaw-carrier. The instant, however, that the rotation of the friction-plate is retarded the scroll-plate, the grooves of which are engaged by lugs 58 on the jaws, is also retarded. The plate carrying the jaws will therefore turn for an instant faster than the scroll-plate by which the jaws are engaged. The action of scroll-groove upon lugs 89 must therefore be to move the jaws inward and to close them firmly upon the hub of the hat-block. As soon as the jaws have engaged the hat-block it is obvious that both scroll-plate and friction-plate must go forward with the other parts. In practice, however, the downward pressure upon the clamping-lever is but for an instant. In fact, all of the operations just described could in practice be performed many times in the length of time it has taken to describe them. The hat-body upon the block is now ready to be acted upon by the pouncing-heads. The operator places one hand (ordinarily the left) upon handles 132 of operating-rods 130 and moves the pouncing-heads to positions in the horizontal planes in which they are required to act, it being understood that the pouncing-heads are so perfectly counterbalanced by weights 129 that they will remain at just the position in which they are placed. The operator then manipulates the pouncing-heads by means of handles 136, one hand only being required, as already explained, and it being understood that the operation of the pouncing-heads is coincident with the rotation of the lathe-spindle and that when the rotation of the lathe-spindle is reversed the rotation of the pouncing-heads will be likewise reversed. It will furthermore be apparent that the pouncing-heads will work equally well no matter in which direction they may be rotated. Suppose that it is desired to first pounce the brim of the hat. The operator takes the handles 136 in his hand and presses the two pouncing-heads upon the opposite sides of the brim, the operation of pouncing being performed almost instantly. Should it be desired in practice, the rotation of the hat-body and also of the pouncing-heads may be reversed by shifting the main belt that has been driving the machine from the tight pulley to the loose pulley, then using brake 17 to stop the motion of the machine, and then shifting the other main belt from the loose pulley to the tight pulley, which will instantly start the machine to moving in the opposite direction, it being understood that the chuck-jaws will not release the block until the clamping-lever has been pressed down upon the friction-plate to retard the movement of the scroll-plate. This operation will not ordinarily require to be performed, as the pouncing operation will be completed without reversing the movement of the lathe-spindle and pouncing-head. The pouncing-heads are made wide enough to pounce the entire brim from the edge to the base of the crown. It is of course not essential that the brim should be pounced first. In pouncing the crown of the hat-body the lower pouncing-head is turned out of the way and the upper pouncing-head is passed over it from brim to tip, or vice versa, the vertical plane in which the head is acting being shifted by movement of the operating-rod 130, by which that head is controlled. As soon as the pouncing operation is completed the two pouncing-heads, or the pouncing-head, if only one has been used, are turned out of operative position. In practice the operation termed "greasing" the hat is usually performed the instant the pouncing-heads are turned out of the way. As this operation is ordinarily performed while the block and body are on a lathe, and as the operation has nothing whatever to do with my present invention, no detailed description is deemed necessary. The operation consists, in brief, in applying a soft oiled pad to the surface of the body after the operation of pouncing for the purpose of improving the luster and finish of the hat and setting the color. After the greasing operation, or after turning the pouncing-heads out of the way, should the greasing be omitted the main belt that has been driving the machine is shifted from the tight pulley to the loose pulley and brake 17 applied to stop the machine. The other main belt is then shifted from the loose pulley to the tight pulley, which reverses the movement of the lathe-spindle. It will be understood that the pouncing-heads swing freely in the horizontal plane by the turning of carrying-plates 96 in the carriers. The clamping-lever is then lifted against the power of spring 82 to disengage lugs 78 from sockets 80, and the clamping-lever then drawn outward—that is, toward the right—as seen in Fig. 1, carrying slide 45 with it, and through the connections already fully described, moving the chuck-spindle back to center—that is, in line with the lathe-spindle. Clamping-lever 51 is then pressed downward for an instant upon the friction-plate, causing the flange of the latter to engage the stationary top plate of the lathe-case, which acts to unlock the hat-block by retarding the rotation of the scroll-plate, thereby throwing the chuck-jaws outward and releasing the block in precisely the same manner as the former downward pressure of the clamping-lever acted to lock the hat-block by throwing the jaws inward. When the movement of the friction-plate is retarded, the scroll-plate is also retarded, so that it rotates slower than the jaw-carrier. The lugs upon the jaws must therefore ride outward in the scroll-grooves, throwing the jaws to their open position. This movement occupies but an instant of time. The instant it is accomplished the main belt that has been driving is shifted back onto the loose pulley and the brake is operated again to stop the machine. The parts are now just at the position at which the present description was commenced. I have described the chuck-spindle as brought back to center while the machine is in full operation and the chuck mechanism as operated to release the hat-block after the chuck-spindle has been brought back to center. It should be understood, however, that this is not essential, as the jaws may be operated to release the hat-block and the machine stopped while the chuck-spindle is out of center. Having finished the pouncing of the hat-body and released the block by reversing the movement of the lathe-spindle and operating the chuck mechanism, the block and the pounced hat-body are removed and a new block and body placed upon the machine, it being understood that the chuck-spindle must always be brought to center in placing a hat-body upon the machine, so as to insure that the block will rotate with the precise eccentric motion that is essential to the operativeness of the machine. Having placed the new block and hat-body in position, the machine is started as before, the chuck mechanism being operated to cause the jaws to clamp the block and the pouncing-heads brought into use as before. These operations are repeated upon each hat that is to be pounced. The operation of the machine is very rapid and the work performed upon hat-bodies perfectly even and regular, the effect of the action of the pouncing-heads being just the same upon each hat-body.

As soon as the pieces of sand-paper become worn they may be removed and new ones inserted by a simple movement of the jaw-operating levers 149.

Having thus described my novel machine and its mode of operation, I claim—

1. The combination, with sliding jaws 26, having lugs 58, and a jaw-carrier 55, having slots to receive said lugs, of a scroll-plate engaged by said lugs, whereby the jaws are opened and closed.

2. The chuck-spindle, the sliding jaws having lugs 58, and a jaw-carrier having slots to receive said lugs, in combination with covering-plate 61, having a hub and extension 63, through which the spindle passes, and a scroll-plate engaged by said lugs to operate the jaws.

3. The combination, with a hat-block having a hub 25, with a central opening, of the chuck-spindle, the jaw-carrier, the sliding jaws having lugs 58, a covering-plate having an extension to engage the opening in the hub, and a scroll-plate engaged by said lugs, whereby the jaws are caused to clamp the hub.

4. The jaw-carrier having recess 67 and slots 59 and the jaws lying in said recess and having lugs engaging said slots, in combination with plate 56, having scroll-groove 60, which is engaged by said lugs, as and for the purpose set forth.

5. The chuck-spindle and a disk 37 by which it is carried, and which is provided with dovetails 38 and 39, in combination with a disk 33, having a groove engaged by dovetail 38, a disk 41, having a groove engaged by dovetail 39 and having a flange 44, and a slide 45, having an opening which is engaged by said flange, whereby the chuck-spindle may be adjusted off its center, as and for the purpose set forth.

6. In a machine of the class described, lathe mechanism comprising a spindle, a disk 33, secured thereto and having a cross-groove, a disk 38, having a dovetail engaging said groove and a dovetail 39 upon its upper side, and a disk 41, having a groove in its under side engaging dovetail 39.

7. The combination, with a lathe-spindle, a disk 33, having a cross-groove, and a disk 37, having a dovetail 38 engaging said groove and a dovetail 39 upon its upper side, of a disk 41, having a groove engaging dovetail 39 and a flange upon its upper side, and a slide 45, having an opening to receive said flange, said parts operating as and for the purpose set forth.

8. In combination, the lathe-spindle, a disk secured thereto and having a groove 34, an intermediate disk having a dovetail 38 engaging said groove, a dovetail 39 upon its upper side carrying the chuck-spindle, a disk 41, having a groove engaging dovetail 39 and a flange 44, and a slide having an opening engaged by said flange, whereby the chuck-spindle is adjusted off its center, as and for the purpose set forth.

9. In combination, disk 33, having a cross-groove, disk 37, having a dovetail 38 engaging said groove and a dovetail 39 upon its upper side, disk 41, having a groove engaging dovetail 39 and having a flange upon its upper side, a slide having an opening to receive said flange, guides for said slide, and a two-part case wherein said mechanism is contained.

10. The combination, with the frame-work, case 28 29, and brackets whereby said case is secured to the frame-work, of upper, lower, and intermediate disks having dovetails, as shown and described, said upper disk having a flange 44, and a slide having an opening to receive said flange.

11. In combination, the upper, lower, and intermediate disks dovetailed together, as shown and described, so that the intermediate and upper disks may reciprocate transversely to each other, the chuck-spindle carried by said intermediate disk, and a slide engaging the upper disk, whereby the chuck-spindle may be thrown off its center, as and for the purpose set forth.

12. The lower disk having groove 34, the intermediate disk having a dovetail engaging said groove, and a dovetail upon its upper side and carrying the chuck-spindle, in combination with the upper disk having a dovetail engaging the intermediate disk, a slot 43, through which the chuck-spindle passes, a flange 44, and a slide having an opening engaged by said flange, as and for the purpose set forth.

13. The combination, with disks 33, 37, and 41, dovetailed together, substantially as shown, of a slide 45, engaged by the upper disk, slide 68, rigidly connected thereto, and a lever 51, pivoted thereto to operate the slides, as and for the purpose set forth.

14. The combination, with disks 33, 37, and 41, dovetailed together, as shown, and a slide 45, to which the upper disk is connected, of a chuck-spindle, a jaw-carrier, jaws, scroll-plate, friction-plate 49, and a lever 51, adapted to clamp said plate, as and for the purpose set forth.

15. The jaw-carrier, the jaws having lugs 58, and the scroll-plate engaged by said lugs and having lugs 57, in combination with stationary flange 32, the friction-plate having lugs engaging lugs 57, and a flange 50, engaging flange 32, and a clamping-lever 51, adapted to clamp the friction-plate down upon flange 32, as and for the purpose set forth.

16. The chuck-spindle, jaws, jaw-carrier, and scroll-plate acting as described, in combination with flange 32, the friction-plate engaging the scroll-plate, and clamping-lever 51, which is adapted to retard the movement of the friction-plate and scroll-plate, thereby causing the jaws to open and close, substantially as described.

17. The lathe-spindle, the lathe mechanism, and the chuck-spindle carried thereby, in combination with the jaw-carrier, the jaws carried by the chuck-spindle, the scroll-plate loose on said spindle and engaging the jaws, the friction-plate also loose on said spindle and engaging the scroll-plate, and a lever 51, adapted to retard the movement of the friction-plate, thereby causing the jaws to either lock or unlock when pressure is applied.

18. The jaw-carrier, the chuck-spindle fixed thereon and having slots 59, the jaws having lugs engaging said slots, and a plate 56, having a scroll-groove engaged by said lugs, in combination with stationary flange 32, the friction-plate adapted to bear on said flange and engaging the scroll-plate, and a lever 51, adapted to retard the motion of the friction-plate, thereby opening and closing the jaws.

19. The combination, with a lathe-spindle, lathe mechanism, substantially as described, carried thereby, and the chuck-spindle carried by the lathe mechanism, of the jaw-carrier, the jaws carried by the chuck-spindle, the scroll-plate engaged by the jaws, and the friction-plate engaging the scroll-plate, said plates being loose on the chuck-spindle, and a clamping-lever 51, adapted to retard the movement of the friction-plate, thereby opening or closing the jaws.

20. The chuck-spindle, plate 48, having a hub secured thereto, and the jaw-carrier, also secured to the spindle and having a hub 66, which receives the hub of plate 48, in combination with the jaws, the scroll-plate engaged by the jaws and having lugs 57, adapted to turn on hub 66, the friction-plate having a lug 57, and a clamping-lever 51, adapted to engage the friction-plate, as and for the purpose set forth.

21. The lathe-spindle, the jaw-carrier, the covering-plate having extension 63, and a nut 64, whereby said plates are secured to the lathe-spindle, in combination with the jaws, the scroll-plate, the friction-plate, and the clamping-lever, said parts being connected and operating together substantially as described.

22. The lathe mechanism, a case therefor having a flange 32 upon its upper part, and a chuck-spindle carried by the lathe mechanism, in combination with the jaw-carrier, jaws, scroll-plate, and friction-plate connected together and acting, as described, and a clamping-lever 51, adapted to press the friction-plate down upon flange 32, thereby retarding its motion, as and for the purpose set forth.

23. Slide 45, a case having slot 71 in its upper part, and slide 68, connected to slide 45 by a screw passing through said slot, in combination with the friction-plate, the chuck mechanism, and a clamping-lever pivoted to slide 68 and having a central opening to receive the chuck mechanism loosely and permit movement.

24. The case having slots in its upper part, slide 45, and slides 68 and 72, connected thereto by screws passing through said slots, in combination with the clamping-lever pivoted to slide 68 and having a handle 84, and a spring 82, acting to hold said clamping-lever pressed downward.

25. A case having slots in its upper side and sockets 80, slide 45, and slide 68, connected thereto and having ears 52, in combination with the clamping-lever pivoted to said ears and having at its outer end a head with a socket 81 and lugs 78, a screw-pin passing through the head and engaging slide 45, and a spring in said socket acting to hold said lugs in engagement with sockets 80, thereby retaining slide 45 at the desired position.

26. A case having slots in its upper side and sockets 80, slide 45 below the case, and slides 68 and 72 above the case, the latter having slots 77, in combination with the clamping-lever pivoted to slide 68 and having at its outer end a head with a socket and lugs 78, a screw passing through one of said slots and connecting slide 68 with slide 45, a screw-pin passing through the head of the clamping-lever and the other slot and engaging slide 45, and a spring surrounding said screw-pin and acting to hold lugs 78 in engagement with slots 77 and sockets 80, as and for the purpose set forth.

27. The case having slot 71 in its upper part and sockets 80, slide 45, and slide 68, connected thereto by a screw passing through said slot, in combination with the clamping-lever pivoted to slide 68 and having a head with lugs 78 on its under side, a screw-pin passing through said head and engaging slide 45, and a spring acting to hold the lugs in engagement with sockets 80, as and for the purpose set forth.

28. The case having slots in its upper part and sockets 80, slide 45, and slides 68 and 72, connected thereto through said slots, slide 72 having slots 77, in combination with the clamping-lever pivoted to slide 68 and having a head with lugs 78 on its under side, a screw-pin passing through said head and slide 77 and engaging slide 45, and a spring acting to hold lugs 78 in engagement with slots 77 and either of the sockets 80, so as to lock slide 45 at either of its positions.

29. The combination, with lathe mechanism, substantially as described and shown, the chuck-spindle carried thereby, the jaws, the scroll-plate, and the friction-plate carried by the chuck-spindle, of slide 45, by which the lathe mechanism is adjusted, and clamping-lever 51, by which said slide is adjusted, and which, when pressed down, retards the motion of the friction-plate and scroll-plate, thereby locking or unlocking the jaws.

30. In combination, the lathe mechanism, slide 45, by which it is adjusted, the chuck-spindle, the jaws, scroll-plate, and friction-plate carried thereby, and a clamping-lever 51, connected to said slide, whereby the lathe mechanism and the chuck mechanism are controlled.

31. The main shaft having duplicate pairs of tight and loose pulleys, a main belt running to each pair of pulleys, and a belt-shifter controlling each belt, in combination with the lathe-spindle and a belt from the main shaft of the lathe-spindle, whereby the lathe-spindle may be caused to turn in either direction.

32. The main shaft having duplicate pairs of tight and loose pulleys, a main belt running to each pair of pulleys, and a belt-shifter controlling each belt, in combination with a lathe-spindle having a fly-wheel, a belt running from the main shaft, and a brake adapted to engage said fly-wheel, whereby the movement of the lathe-spindle may be started, stopped, and reversed.

33. The combination, with the main shaft having duplicate pairs of tight and loose pulleys, belts running over said pulleys, and belt-shifters controlling said belts, of a lathe-spindle, a belt running from the main shaft to the lathe-spindle, the lathe mechanism, substantially as described and shown, the chuck-spindle carried thereby, the jaws, scroll-plate, and friction-plate, and a clamping-lever 51, which is adapted to retard the friction-plate and scroll-plate to open or close the jaws each time the movement of the lathe-spindle is reversed.

34. The combination, with lathe mechanism and chuck mechanism whereby the hat is held and its movements controlled, of a pouncing-head having a pouncing-surface adapted to move over the surface of the hat from tip to brim and rotating in a plane tangential to the surface it acts upon.

35. The combination, with lathe mechanism and chuck mechanism whereby the hat is held and its movements controlled, of a pouncing-head carried by a shank having vertical movement, said head being adapted to turn on said shank and provided with a pouncing-surface having a rotary movement in a plane tangential to the surface of the hat, so that the entire surface from tip to brim may be acted upon.

36. The combination, with lathe mechanism and chuck mechanism whereby a hat-block is held and its movements controlled, of a pouncing-head carried by a shank having vertical movement, said head being adapted to turn on said shank, a disk of sand-paper carried by said head, and a holding-plate in which said head turns freely.

37. In a machine of the class described, the combination, with holding-plate 133, of a pouncing-head carried thereby, which rotates in a plane tangential to the surface it acts upon, said head having a rubber disk, a pair of jaws, and a disk of sand-paper clamped to the rubber disk by said jaws.

38. In a machine of the class described, the combination, with a vertically-movable shank, of a pouncing-head rotating thereon, said head comprising a rubber disk, a device—for example, a flanged plate—for holding it in position, jaws, and levers 149, whereby the jaws are operated.

39. The holding-plate having a central opening, plate 139, having a hub engaging said opening, and a slot 143, in combination with the upper plate, jaw-operating levers pivoted thereto and extending down through slot 143, the lower plate carrying spring-actuated jaws engaged by said levers, flanged plate 154, having a central hub, a rubber disk held by the flanged plate, and a screw 156, extending down through the parts and engaging the hub of the flanged plate, whereby the parts are held together.

40. The combination, with a rotating pouncing-head having spring-actuated sliding jaws, of a disk of sand-paper held by said jaws.

41. A pouncing-head consisting, essentially, of a rubber disk, a pair of spring-actuated jaws, and a pouncing-surface of sand-paper secured thereto by said jaws.

42. Shank 98, holding-plate 133, turning thereon, and a rotating pouncing-head journaled therein, said head having jaws, jaw-operating levers, a rubber disk, and a disk of sand-paper having tabs clamped by the jaws.

43. In combination, holding-plate 133, a pouncing-head journaled therein and provided with a belt-pulley, whereby motion is imparted thereto, jaws, jaw-operating levers, a rubber disk, and a disk of sand-paper clamped thereto by the jaws.

44. The combination, with plates 139, 140, and 141, the jaws, and the jaw-operating levers, of the rubber disk, flanged plate 154, engaged by the rubber disk and having a central hub, and a screw extending down through said plates and engaging the hub.

45. The holding-plate having a central opening, plate 139, having a hub engaging said opening, and centering-pins 144, extending from opposite sides thereof, in combination with upper and lower plates engaged by said centering-pins, the flanged plate having a central hub, and a screw 156, extending through the upper plates and engaging the flanged plate.

46. In a rotating pouncing-head, the combination, with flanged plate 154, of a rubber disk having a lip engaging the flange, a disk of sand-paper, and jaws holding the sand-paper to the rubber disk.

47. The flanged plate and the rubber disk having a lip engaging said flange, in combination with plate 141, having a hub on its under side adapted to lie within said flange and lip, and recesses 163, the jaws having lugs 162, lying in said recesses, and springs in said recesses acting to hold the jaws at the closed position.

48. The flanged plate, the rubber disk held thereby, and the lower plate, said plate and disk having recesses 161, in combination with the jaws having lips to engage said recesses and springs to hold the lips in the engaged position.

49. In a pouncing-head, flanged plate 154, the rubber disk engaging said plate, lower plate 141, and the jaws, in combination with plates 139 and 140 and a screw holding the parts together, substantially as described.

50. In a pouncing-head, the combination, with the central plate having slot 143, the rubber disk, the sand-paper disk, and the jaws, of plate 140, carrying jaw-operating levers which extend through said slot and operate the jaws to engage and release the sand-paper disk.

51. The central plate having slot 143, the upper plate, and the jaw-operating levers pivoted thereto and extending through said slot, in combination with the lower plate, spring-actuated jaws carried thereby and having lugs 165, which are engaged by the jaw-operating levers, and rubber disk engaging the lower plate, as and for the purpose set forth.

52. The holding-plate having a central opening, plate 139, having a hub engaging said opening, and the lower plate carrying spring-actuated jaws, in combination with the upper plate having a flange 147 resting thereon and jaw-operating levers 149, pivoted to said plate.

53. Shank 98 and holding-plate 133, turning thereon and having a central opening, in combination with the rotating pouncing-head having jaws, for the purpose set forth, and a belt-pulley whereby motion is imparted thereto.

54. Shank 98, in combination with the rotary pouncing-head, and a holding-plate by which said head is carried, said plate having a stump 135 for engagement with the shank.

55. Shank 98, having a slot 138, in combination with a pouncing-head having a belt-pulley by which it is driven, a holding-plate in which the pouncing-head is journaled, and which is provided with a stump 135, and a screw-pin passing through said slot and engaging the stump, so as to permit the holding-plate and pouncing-head to be turned independently of the shank.

56. The combination, with a pouncing-head, a holding-plate by which it is carried, and a shank 98, of a vertically-movable carrier and a carrying-plate 96 to which said shank is attached.

57. The combination, with a holding-plate, pouncing-head, and shank 98, of a carrying-plate to which the shank is connected, a carrier for the carrying-plate, and rods 85 and 86, upon which the carrier is adapted to move.

58. In a hat-pouncing machine, a movable carrier consisting of a main plate having a recess 94, with a central hub, carrying-plate 96, journaled thereon, and a cap-plate 92, bolted to the main plate.

59. In a hat-pouncing machine, movable carriers, each consisting of plates 89, 90, and 112, a cap-plate 92, and a carrying-plate 96, journaled therein.

60. The lathe-spindle, grooved shaft 15, and a belt extending from said spindle to said shaft, in combination with the vertical rods, the carriers sliding thereon, each carrier having a sleeve with a key to engage the groove in shaft 15, and a belt-pulley 100, as and for the purpose set forth.

61. The combination, with grooved shaft 15, of a carrier having a central hub, a carrying-plate journaled on said hub, and a sleeve within the hub having a key to engage the groove and carrying a belt-pulley, as and for the purpose set forth.

62. The holding-plates, the pouncing-heads having belt-pulleys 145, and grooved shaft 15, in combination with carriers provided with central hubs upon which carrying-plates 96 are journaled, sleeves within said hubs having keys to engage the shaft and belt-pulleys 100, and belts connecting pulleys 100 and 145.

63. Grooved shaft 15, carriers, carrying-plates, and sleeves 101, having keys to engage said groove and belt-pulleys, in combination with shanks 98, connected to the carrying-plates, holding-plates connected to the outer ends of said shanks, pouncing-heads having belt-pulleys journaled in said holding-plates, and belts connecting said belt-pulleys.

64. Grooved shaft 15, carriers, carrying-plates, and sleeves having keys to engage said groove, and belt-pulleys, in combination with shanks 98, connected to the carrying-plates and having oblique slots 138, holding-plates connected to the outer ends of said shanks by screw-pins passing through said slots, pouncing-heads having belt-pulleys journaled in said holding-plate, and belts connecting said belt-pulleys so that the pouncing-heads may be turned on the shanks and their operating planes changed without shortening the belt or changing the speed of the pouncing-heads.

65. The tubular shank having oblique slot 138, the holding-plate having a stump secured to said shank by a screw-pin in said slot, and a pouncing-head journaled in said holding-plate, in combination with a carrier, a carrying-plate journaled therein to which the other end of said shank is connected, and a belt extending from said carrier to the pouncing-head, so that when the holding-plate and pouncing-head are turned they will be drawn inward slightly to compensate for shortening the belt by twisting.

66. The combination, with shank 98 and a pouncing-head carried thereby, of a sliding guard-plate upon the shank which covers and protects the pouncing-head and holds down the brim, as and for the purpose set forth.

67. The tubular shank having slots 172, a sliding block within said shank, and a sleeve upon the outer side thereof, in combination with a pin 176, fixed in said block and sleeve and sliding in said slots, a yoke upon the outer side of the sleeve, and guard-plate 169, carried by the yoke.

68. The tubular shank having slots 172 and enlargements 173, a sliding block within said shank, and a sleeve upon the outer end thereof, in combination with a pin 176, fixed in said block and sliding in said slot, a yoke upon the outer side of the sleeve, a guard-plate having a shank attached to the yoke, a stump 177, to engage the enlargements, and a spring 178, bearing upon the sleeve and the top of the yoke to hold said guard-plate either in or out of operative position.

69. The shank having slots 172, a sliding block within said shank, and a sleeve upon the outer side thereof, in combination with a pin 176, fixed in said block and sliding in said slots, a yoke upon the outer side of the sleeve, guard-plate 169, carried by the yoke, and a spring 179, acting to draw said block, yoke, and belt to the disengaged position.

70. The combination, with the holding-plate, a pouncing-head carried thereby, the tubular shank to which it is connected, and the carrying-plate to which the shank is connected, of guard-plate 169, yoke 175, to which it is attached, a block within the tubular shank to which the yoke is connected, and a spring 179, connected to said block and to the carrying-plate, substantially as described.

71. The tubular shank having slots 172, with enlargements 173, and a pin 176, fixed in said block and adapted to slide in said slots, in combination with a sleeve upon the outer side of the tube, a yoke outside of the sleeve, a guard-plate having a shank attached to the yoke, and a stump to engage said enlargements, as and for the purpose set forth.

72. Vertical rods 85 and 86, the carrying-plates, and the carriers, in combination with tubes 108 on rods 86 and a set-screw 110, whereby each carrier is attached to one of the tubes, leaving the other carrier free to slide on that tube, substantially as described.

73. The carrying-plates and the carriers, in combination with rods 85 and 86, upon which the carriers slide, and tubes 108, sliding on rods 86, each of said carriers being attached to one of the tubes and sliding freely upon the other.

74. The combination, with upper and lower pouncing-heads, carriers, carrying-plates, and intermediate connections, substantially as described, of rods 85 and 86, tubes 108 on rods 86, and means, as a set-screw, for attaching each carrier to one of the tubes.

75. The combination, with rods 85 and 86 and the carriers, of tubes 108, having bushings which slide on rods 86, each carrier being attached to one of the tubes and sliding freely upon the other.

76. The combination, with rods 85 and 86, the carriers, and tubes 108, of clips 114 at the ends of said tubes, and wires 121, connected to said clips, whereby the tubes and carriers are raised and lowered, as and for the purpose set forth.

77. The pouncing-heads, holding-plates, carrying-plates, and carriers, in combination with vertical rods, tubes 108, each carrier being connected to one of said tubes, and means— for example, wires 121—whereby said tubes, respectively, and the parts carried thereby are raised and lowered independent of each other.

78. The combination, with the carriers, tubes 108, and the vertical rods, each carrier being connected to one of said tubes and sliding upon the other, of wheels 120 and wires passing around said wheels and connected to opposite ends of the tubes, as and for the purpose set forth.

79. The vertical rods, the carriers, and tubes 108, in combination with clips attached to the ends of said tubes, yokes in said clips, one yoke on each tube being adjustable, wheels 120, and wires passing around said wheels and connected to said yokes, whereby the tubes are moved upward or downward and the wires tightened up as required.

80. The combination, with the vertical rods, the carriers, tubes 108, wheels 120, and wires passing around said wheels and connected to the tubes, of angle-levers 126, rigidly connected to the wheels, and weights connected to the angle-levers, whereby the weight of the carriers and parts carried thereby is counterbalanced.

81. The wheels, angle-levers rigidly connected thereto, weights 129, and operating-levers, in combination with the vertical rods, carriers, tubes 108, and wires passing around said wheels and connected to said tubes, as and for the purpose set forth.

82. The combination, with the vertical rods, carriers, and the tubes, of wires 121, connected to said tubes, wheels around which said wires pass, and clamps 123, whereby the wires are held to the wheels.

83. The wheels, studs $124^{a}$, to which they are rigidly secured, angle-levers also secured to said studs, and weights and operating-levers secured to the angle-levers, in combination with the carriers, the vertical rods, the tubes, and wires 121, as described, whereby the carriers may be raised or lowered and will remain at the position in which they are placed.

84. The combination, with the carriers, wheels, vertical rods, and tubes 108, of clips 114 at the ends of the tubes, yokes in said clips, one of which is adjustable, and wires passing around said wheels and connected to said yokes, as and for the purpose set forth.

85. The combination, with the wheels, wires, and tubes, of clips 114, bolts and nuts 115, by which they are clamped to the tubes, yokes 118, to which the wires are attached, said yokes having shanks engaging squared openings in the clips and threaded at their upper ends, and nuts 119, by which the yokes are adjusted, as and for the purpose set forth.

86. The combination, with the vertical rods, tubes 108, the wheels, and wires 121, passing around the wheels and connected to the tubes, of the carriers rigidly connected to the tubes, and buffer-springs 106 and 107, against which the carriers strike when moved to their lowered position.

87. The frame-work, the vertical rods, and the upper and lower carriers, in combination with springs 106, which rest on the frame-work, and upon which the lower carrier rests, and springs 107, resting upon the lower carrier and upon which the upper carrier rests.

88. The carriers, tubes 108, to which they are connected, rods 85, upon which the carriers slide, and rods 86, upon which the tubes slide, in combination with the wheels, wires passing around the wheels and connected to the tubes, and means, substantially as described and shown, for raising and lowering the carriers and for retaining them at any desired position.

89. The carriers consisting of parts 89 and 90, matched together, as shown, a carrying-plate and a cap-plate, in combination with rods 85, upon which parts 89 slide, tubes 108, connected to parts 90, and rods 86, upon which parts 90 slide, said parts being secured together substantially as shown.

90. The carriers consisting of parts 89 and 90, secured together as shown, parts 90 having half-sockets 111, in combination with plates 112, also having half-sockets and bolted thereto, tubes 108, clamped by said half-sockets, and tubes 85 and 86, engaged respectively by parts 89 and 90.

91. The combination, with the pouncing-heads having belt-pulleys and the vertically-movable carriers, also having belt-pulleys, of the lathe-spindle, shaft 15, upon which the carriers slide and which drives the belt-pulleys thereon, and belts whereby shaft 15 is driven from the lathe-spindle and the pouncing-heads are driven from shaft 15.

92. The main shaft having duplicate pairs of tight and loose pulleys, main belts extending over said pulleys, belt-shifters controlling said belts, the lathe-spindle, and a belt extending thereto from the main shaft, in combination with the pouncing-heads, the carriers moving vertically upon a shaft 15, and belts connecting shaft 15 with the lathe-spindle and the pouncing-heads with shaft 15, whereby the motion of the lathe-spindle and the pouncing-heads may be stopped, started, or reversed.

93. The combination, with shanks 98, pouncing-heads rotating thereon and carrying rotating pouncing-disks, and chuck mechanism for carrying a hat-block and hat-body, of lathe mechanism, substantially as described and shown, whereby eccentric rotation is imparted to the hat-block to cause the surface of the body and brim to pass the pouncing-heads with a circular motion.

94. The chuck mechanism for carrying a hat block and body and lathe mechanism, substantially as described and shown, by which the chuck mechanism is carried, and which is adapted to throw the latter from its center, so as to cause the chuck mechanism to rotate eccentrically, but the surface of the hat block and body to pass a fixed point with a circular motion, in combination with pouncing-heads carrying rotating pouncing-disks adapted to act on the opposite sides of a hat-brim simultaneously.

95. Shanks 98, the pouncing-heads rotating thereon and carrying rotating pouncing-disks, vertically-movable carriers to which the shanks are connected, and mechanism for controlling the carriers, in combination with the lathe-spindle, lathe mechanism carried thereby, chuck mechanism carried by the lathe mechanism, and belt-connections whereby the motion of the lathe-spindle and the pouncing-heads may be stopped, started, or reversed.

96. The chuck-spindle, jaws adapted to grasp a hat-block, and lathe mechanism, substantially as described and shown, whereby said chuck-spindle may be thrown from its center, in combination with pouncing-heads carrying rotating pouncing-disks and vertically-movable carriers by which said pouncing-heads are controlled and operated.

97. The combination, with a hat-block whose surface in use passes a fixed point with a circular motion, of a vertically movable and rotating pouncing-head carrying a rotating pouncing-surface.

98. The combination, with a hat-block adapted to carry a hat-body and mechanism, substantially as described and shown, for causing the surface of said block to pass a fixed point with a circular motion, of a pair of adjustable pouncing-heads carrying rotating pouncing-surfaces, whereby both sides of a hat-brim may be pounced simultaneously, said pouncing-surfaces rotating in the plane of the brim.

99. The combination, with a hat-block, chuck mechanism for carrying said block, and lathe mechanism for causing the surface of said block to pass a fixed point with a circular motion, of adjustable pouncing-heads carrying rotating pouncing-surfaces and mechanism for controlling said pouncing-heads, so that both sides of a hat-brim may be pounced simultaneously.

100. In a machine of the class described, a chuck-spindle, jaws carried thereby, jaw-operating mechanism, and mechanism, substantially as described and shown, for moving the chuck-spindle from the center, in combination with rotating pouncing-heads, holding-plates, carrying-plates, shanks connecting said holding-plates and carrying-plates, carriers, wires connected to said carriers, and wheels around which said wires pass, whereby the carriers and parts moving therewith are raised and lowered in use.

101. The combination, with a chuck-spindle, jaws carried thereby, a scroll-plate for actuating the jaws, and a friction-plate to which the scroll-plate is connected, of lathe mechanism consisting, essentially, of a rotating disk, intermediate and upper disks dovetailed together, as shown, and moving transversely to each other, a slide for adjusting the upper disk, for the purpose set forth, and a clamping-lever which operates the slide and is adapted to retard the motion of the friction-plate, as and for the purpose set forth.

102. The combination, with the chuck-spindle, jaws, scroll-plate, and friction-plate, of lathe mechanism consisting of upper, lower, and intermediate disks connected together and operating as described, a slide for adjusting the upper disk, a clamping-lever to control the movement of the slide and also to retard the friction-plate, for the purpose set forth, a main shaft having duplicate tight and loose pulleys, belts running over said pulleys, a belt for transmitting motion to the lathe mechanism, and a belt-shifter for controlling the movement of the main shaft.

103. The combination, with a hat-block for carrying a body and adjustable rotating pouncing-heads adapted to act on said body, of a spindle carrying jaws which engage the block, mechanism, substantially as described and shown, for operating the jaws, and lathe mechanism consisting of an upper disk to which said spindle is attached, a lower disk, and an intermediate disk dovetailed to the upper and lower disks, whereby the chuck-spindle may be adjusted to cause the surface of the hat-body to pass a fixed point with a circular motion.

In testimony whereof I affix my signature in presence of two witnesses.

JOHN B. HOWE.

Witnesses:
A. M. WOOSTER,
A. B. FAIRCHILD.